United States Patent
Larsen et al.

(10) Patent No.: US 6,854,764 B2
(45) Date of Patent: Feb. 15, 2005

(54) FLEXIBLE AIRBAG INFLATOR (75) Inventors: Alan R. Larsen, Layton, UT (US); Earl H. Nelson, Hooper, UT (US)

(73) Assignee: Autoliv ASP, Inc., Ogden, UT (US)

(*) Notice: Subject to any disclaimer, the term of this patent is extended or adjusted under 35 U.S.C. 154(b) by 117 days.

(21) Appl. No.: 10/081,825

(22) Filed: Feb. 20, 2002

(65) Prior Publication Data

US 2003/0155757 A1 Aug. 21, 2003

(51) Int. Cl.[7] .............................................. B60R 21/28
(52) U.S. Cl. ..................................... 280/741; 280/742
(58) Field of Search ................................ 280/740, 741, 280/742, 736

(56) References Cited

U.S. PATENT DOCUMENTS

| | | | | |
|---|---|---|---|---|
| 3,813,007 A | * | 5/1974 | Doin et al. | 222/4 |
| 3,944,769 A | * | 3/1976 | Wagner | 200/83 A |
| 5,028,070 A | * | 7/1991 | Bender | 280/741 |
| 5,318,323 A | * | 6/1994 | Pietz | 280/736 |
| 5,411,290 A | * | 5/1995 | Chan et al. | 280/737 |
| 5,562,304 A | * | 10/1996 | Gest | 280/740 |
| 5,788,270 A | | 8/1998 | Haland | |
| 5,806,884 A | | 9/1998 | Johnson | |
| 5,820,160 A | | 10/1998 | Johnson | |
| 5,845,933 A | | 12/1998 | Walker | |
| 5,871,228 A | | 2/1999 | Lindsey | |
| 5,884,937 A | | 3/1999 | Yamada | |
| 5,979,936 A | | 11/1999 | Moore | |
| 6,032,979 A | | 3/2000 | Mossi | |
| 6,073,961 A | | 6/2000 | Bailey | |
| 6,089,598 A | | 7/2000 | Snyder | |
| 6,095,561 A | | 8/2000 | Siddiqui | |
| 6,099,033 A | | 8/2000 | Jenkins | |
| 6,106,008 A | | 8/2000 | Blackshire | |
| 6,123,359 A | | 9/2000 | Cabrera | |
| 6,142,519 A | | 11/2000 | Smith | |
| 6,176,511 B1 | * | 1/2001 | Adkisson et al. | 280/728.2 |

* cited by examiner

Primary Examiner—Paul N. Dickson
Assistant Examiner—Toan C To
(74) Attorney, Agent, or Firm—Sally J. Brown (57) ABSTRACT

A flexible inflator provides enhanced features to an inflatable airbag restraint such as flexibility to facilitate installation in the tight spaces along the sides of a vehicle. The flexible inflator may include a housing with first and second ends made of corrugated metal. End caps are attached to each end of the cylindrical housing to form a pressure vessel. Combustible material, capable of generating inflation fluid, is positioned within a membrane inside the housing. An initiator is in communication with the combustible material, for initiating a combustible reaction within the housing. The housing is surrounded by a steel wire over-braid. The corrugated steel housing can be readily pierced without leaving a burr to damage the environmental seal. The corrugation also provides a plenum allowing gasses to readily flow from around the inflation fluid generant.

42 Claims, 4 Drawing Sheets

FLEXIBLE AIRBAG INFLATOR

BACKGROUND OF THE INVENTION

1. The Field of the Invention

The present invention relates to a flexible airbag inflator. More specifically, the present invention relates to an airbag inflator with a corrugated metal housing that can be perforated to create inflation fluid exit ports, and bended without adversely affected the membrane-enclosed combustible material within the housing.

2. The Relevant Technology

Inflatable safety restraint devices, or "airbag restraints," are mandatory on most new vehicles. Airbag restraints commonly contain a collision sensor, inflator, and an airbag or inflatable curtain. In the event of an accident, the collision sensor within the vehicle, such as an accelerometer, measures abnormal deceleration and triggers the inflator. The inflator is connected to the airbag which is typically housed in the steering wheel on the driver's side of a vehicle and in the dashboard on the passenger side of a vehicle. Airbags are normally housed in an inflated and folded condition to minimize space requirements. Upon receipt of the signal from the collision sensor, the inflator rapidly produces a quantity of inflation fluid or gas which fills the airbag and protects the passenger from harmful impact with the interior of the car.

Airbags have also been developed in response to the need for passenger protection from lateral impacts with the side of a vehicle's interior. This situation might occur when another vehicle collides with the side of the car, or when the car loses control and rolls over causing the side of car to repeatedly impact the ground. Side impact inflatable curtains are designed to prevent the head of a vehicle occupant from emerging through the window opening or from colliding with a collision surface at the side of the vehicle. The shape of the curtain generally conforms to the shape of the window area or side of the car adjacent the passenger's torso. Side inflatable curtains are typically housed in an uninflated and folded condition and attached to, or within, the roof rail of the vehicle behind a vehicle headliner.

With the ultimate premium on vehicle interior space, vehicle manufacturers are always seeking for new and creative ways to secure and house the curtain and the inflator within the vehicle. In certain circumstances, it is desirable to have the inflator conform to a curved portion of the vehicle frame. The problem with most inflators, however, is that they are not flexible. Thus, they cannot be mass produced for different vehicle applications. Accordingly, additional tooling and manufacturing is required which drives up costs. Further, with fixed and rigid inflator configurations, installation into the specific vehicle for which a known inflator is manufactured must be exact and precise. Thus, installation becomes more time consuming which drives up installation costs.

Some attempts have been made to provide a flexible inflator, but these inflators also suffer significant disadvantages. One known inflator includes a rubber housing. Oftentimes, however, the exit ports in the rubber through which the hot inflation fluid must pass will deform, expand, or crack, under the high inflation pressure and hot expanding gasses. This can negatively affect the rate at which the inflation fluid inflates the curtain, and thus, inflation performance. Many known flexible inflators do not provide controlled diffusion of combustion pressures. Other inflators, while flexible, are not rigid enough to protect the gas generating material, which, if damaged, can also negatively affect the rate of evolving gas. Yet another problem with many flexible inflators is that they do not provide for high pressure containment for safe use in automotive applications. For example, in certain situations, it is desirable to use stored pressurized gas to create inflation fluid. Some inflators that provide flexibility, do so at the expense of being a pressure vessel.

Another problem with known inflators is that they do not account for the hot inflation gasses which could burn a passenger, even through the fabric of the curtain, during or immediately after inflation. Some known inflators may provide a heat sink, but again, these inflators sacrifice flexibility because the heat sink employed is rigid metal. Other flexible heat sinks can cause damage to the combustible materials or material seals because of burrs or exposed wires in the heat sink materials after inflation gas exits ports are pierced through the head sinks.

Thus, it would be an advancement over the prior art to provide a flexible inflator that can conform to the shape of the headliner or interior frame of a vehicle, yet won't damage the gas generating material or compromise inflation performance. It would be another advancement to provide such an inflator which has discrete exit ports that can withstand the heat and pressure of the expanding inflation fluid and not deform, thus preserving the rate of evolving gas. It would yet be another advancement to provide such an inflator that provides high pressure containment for safe use in automotive applications. It would yet be another advance to provide such an inflator with a heat sink for the inflation exiting fluid and ports that will not allow damage to the combustible material or the seal containing the combustible material.

Such an inflator is disclosed and claimed herein.

BRIEF SUMMARY OF THE INVENTION

The apparatus of the present invention has been developed in response to the present state of the art, and in particular, in response to the problems and needs in the art that have not yet been fully solved by currently available airbag curtain inflators. Thus, it is an overall objective of the present invention to provide an airbag/curtain inflator that is flexible without comprising inflation properties.

To achieve the foregoing advantages and objectives, and in accordance with the invention as embodied and broadly described herein in the preferred embodiment, a novel airbag/curtain inflator is provided. The inflator may include a housing having a first and second end. In one preferred embodiment, the housing is made of corrugated metal and is substantially cylindrical. A pair of end caps are attached to each end of the housing.

Combustible material may be positioned within the housing. The material is capable of generating inflation fluid upon ignition which fills an attached curtain. In one preferred embodiment, the combustible material is combustible solid fuel tablets coated with an ignition enhancer. The combustible material may be substantially enclosed by a membrane which defines a combustion chamber. The membrane may act as an environmental seal protecting the combustible material. The membrane in one embodiment is configured to expand and burst at a predetermined breakout pressure created by the inflation fluid. When the membrane bursts, inflation gas may escaped through exit ports perforated or bored in the housing. Because the housing is metal, the exit ports are discrete and resist deformation under the heat and pressure of the expanding inflation fluid.

A mesh covering may be positioned about the housing, assists in maintaining the inflator as a pressure vessel by limiting the axial expansion of the housing. The covering may also act as a heat sink for inflation fluid escaping through the covering. In one embodiment, the mesh covering is braided metal, preferably steel, wire which can stretch as the housing is flexed. Not only does the corrugated metal housing allow for flexing and expansion so that it can conform to a variety of configurations within a vehicle interior, but the corrugated housing also defines distal peak portions and proximal valley portions. The distal peak portions provide a surface for perforating the housing such that any perforation burrs are separated from the interior combustible material and the membrane. The peak portions also provide a series of points over which the wire braid can be placed which separates any potentially damaging wire ends from the membrane and combustible material. The housing may be detached from the membrane such that flexing of the housing does not directly translate to stretching or deformation of the membrane or internal combustible material. This configuration prevents damage which could adversely alter the rate at which the inflation fluid escapes the housing, or other inflation properties. The housing, end caps, and covering, may also comprise a pressure vessel to allow pressurized gas to be used as the inflation fluid generant.

An initiator may be positioned in communication with the combustible material for initiating a combustible reaction within the housing. The initiator may include a squib and may be integral with one of the end caps.

Accordingly, the inflator of the present invention provides a flexible inflator that can conform to the shape of a vehicle interior without damaging the combustible material with the housing. This inflator is advantageous because it provides discrete exit ports that can withstand the heat and pressure of the expanding inflation fluid and not deform, which preserves the inflation properties of the inflator. Another advantage of the inflator of the present invention is that it provides high pressure containment for safe use in automotive applications and includes a heat sink that will not damage the combustible material or a seal containing the combustible material.

These and other objects, features, and advantages of the present invention will become more fully apparent from the following description and appended claims, or may be learned by the practice of the invention as set forth hereinafter.

BRIEF DESCRIPTION OF THE DRAWINGS

In order that the manner in which the above-recited and other advantages and objects of the invention are obtained will be readily understood, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE PREFERRED EMBODIMENTS

The presently preferred embodiments of the present invention will be best understood by reference to the drawings, wherein like parts are designated by like numerals throughout. It will be readily understood that the components of the present invention, as generally described and illustrated in the figures herein, could be arranged and designed in a wide variety of different configurations. Thus, the following more detailed description of the embodiments of the apparatus, system, and method of the present invention, as represented in FIGS. 1 through 4, is not intended to limit the scope of the invention, as claimed, but is merely representative of presently preferred embodiments of the invention.

Figure 1:
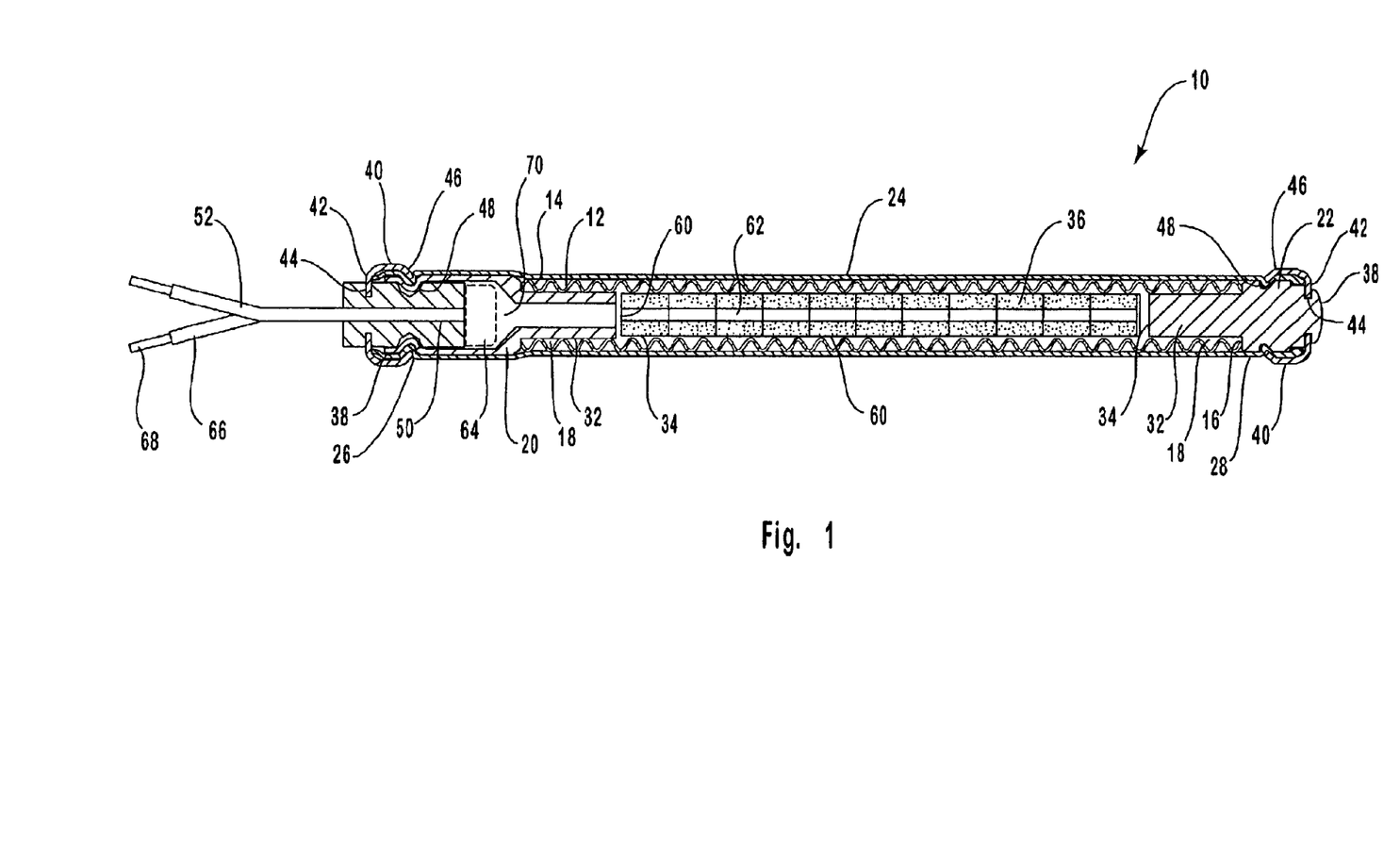
FIG. 1 is a side cross sectional view of one embodiment of an airbag/curtain inflator according to the present invention.

With particular reference to FIG. 1, an airbag inflator according to the present invention is generally designated at 10. The inflator 10 includes a housing 12 having a first end 14 and a second end 16. In one preferred embodiment, the housing 12 comprises corrugated steel. The housing 12 may be cylindrical with openings 18 defined by each end 14, 16 of the housing. In one embodiment, as discussed in greater detail below, the openings 18 are configured to received a first end cap 20 adjacent the first end 14 of the housing 12, and a second end cap 22 adjacent the second end 16 of the housing 12. The housing 12 may include a mesh covering 24 positioned about the housing 12. The covering 24 has a first end 26 and a second end 28 and consists of braided metal wire. In one embodiment, the metal is steel. The braided nature of the covering 24 allows it to flex and expand as the housing 12 flexes and expands. Thus, the present invention allows for flexibility and expandability which facilitates attachment of the inflator to irregularly shaped vehicle interiors. The housing 12 should be of sufficient strength in combination with the covering 24, to withstand the pressure and heat of expanding inflation fluid, yet should allow the corrugate to flex and expand.

The first end cap 20 is attached to the first end 14 of the housing 12. A second end cap 22 is attached to the second end 16 of the housing 12. In the embodiment of FIG. 1, the end caps 20, 22 each contain a stop portion 32 positioned within each end 14, 16 of the housing 12. An inner end 34 of each stop portion 32 defines the space in which combustible material 36 is positioned. The stop portion 32 of each end cap 20, 22 could be integral with the end caps 20, 22 or a separate stud attached to each end cap 20, 22.

As discussed in conjunction with FIGS. 3 and 4 below, the end cap can be configured in a variety of ways to practice the teachings of this invention, including threaded caps that can be secured to an exterior or interior of the housing 12. Additionally, each end cap 20, 22 may be secured to a respective end 14, 16 of the corrugated metal housing 12, or to a respective end 26, 28 of the covering 24 positioned about the housing 12. In the embodiment illustrated in FIG. 1, the stop portion 32 of each end cap 20, 22 is snugly positioned within the openings 18 of each end 14, 16 of the housing 12 with an outer end 38 of each end cap 20, 22 extending beyond respective ends 14, 16 of the housing 12. The outer end 38 of each end cap 20, 22 is secured to the covering 24 by a crimped sleeve 40. The sleeve 40 is preferably annular with a first end 42 fixed within a slot 44 within each end cap 20, 22. A second end 46 of the sleeve is positioned about a portion of the covering 24. The second end 46 is crimped to force a respective end 26, 28 of the covering 24 into an indentation 48 within each end cap 20, 22, thus securing the covering 24 to the end caps 20, 22. Because the corrugate housing 12 elongates when internal pressure is applied, it does not need to be directly attached by other means. However, in one alternative embodiment, the corrugate housing 12 may be sealed to the end caps 20, 22 by an o-ring placed between the corrugate housing 12 and the initiator 52 or the first end cap 20.

The first end cap 20, 22 includes an opening 50 through which an initiator 52 is attached in sealing communication with the combustible material 36. This sealing communication can be accomplished by laser welding, crimping, threading, O-ring, or other suitable hermetic seal. The housing 12, first end cap 20, second end cap 22, and covering 24 are configured to form a pressure vessel suitable for containing pressurized gas. The housing has sufficient hoop strength to limit radial expansion of the gas and the covering 24 limits the axial expansion of the corregated housing 12 under the force of expanding gas. Accordingly, the present invention provides for high pressure retention of combustion gases.

It will be appreciated that the end caps 20, 22 can be configured in a variety of ways and attached to the housing 12 and/or covering 24 in a variety of ways to practice the teachings of this invention. For example the crimped sleeve 40 maybe part of an integrated sub-assembly of each end cap 20, 22. The end caps 20, 22 may be attached to the housing 12 or covering 24 by threaded engagement, welding, epoxy, or other known methods. Additionally, either or both end caps 20, 22 may be configured to receive the initiator 52. In a presently preferred embodiment, the end caps 20, 22 are made of steel.

The combustible material 36 is capable of generating inflation fluid when heated, ignited or when a combustible reaction is otherwise started. In the present invention, the combustible material 36 includes combustible solid fuel tablets coated with an ignition enhancer. In alternative embodiments, the combustible material 36 may include stored inert gas. One suitable stored gas is Argon. Other suitable combustible materials 36 may include any number of pyrotechnic ignitable materials, including, but not limited to powder, pellets, unitary masses, other gases with a heating device such as a pyrotechnic or heater. The combustible material 36 or generant is preferably compressed to maximize space.

The combustible material 36 is substantially enclosed by a membrane 60. The membrane 60 is positioned within the housing 12 and defines a combustion chamber 62 in which the combustible material 36 reacts to form inflation fluid. In one preferred embodiment, is attached to the membrane 60. It will be appreciated by those of skill in the art that there are different ways to attach combustible materials 36 to a membrane 60, including, but not limited to adhesive bonding and friction. The membrane is constructed of a metalized film. One suitable film is Mylar®. In one embodiment, the membrane 60 forms an environmental seal around the combustible material 36 to protect it. The membrane 60 is configured to expand and burst at a predetermined breakout pressure created by the inflation fluid, after the combustible material 36 is ignited.

The initiator 52 is in communication with the combustible material 36, for initiating a combustible reaction within the housing 12 and combustion chamber 62. In the embodiment illustrated in FIG. 1, the initiator 52 is part of the subassembly of the first end cap 20. A back end 66 of the initiator 52 includes an electrical connector 68 for connection to a collision sensor (not shown) which provides a signal to activate the initiator 52 and thus the inflator 10. A front end 70 of the initiator 52 may be spaced from and adjacent to the combustible material 36, but suitable for bursting through a bulkhead or membrane 60 to ignite the combustible material 36. In one alternative embodiment, the front end 70 of the initiator 52 extends into the combustion chamber 62.

The initiator 52 can be of any of a suitable type initiators 52 capable of starting a reaction in the combustion chamber 62. In one preferred embodiment, the initiator 52 is a squib that is integrated within the end cap 20 subassembly. Other initiators 52 may include a bridgewire, spark discharge, heating or exploding element including wire or foil, pyrotechnic charge, or gas or heat generating devices. Initiator 52 material may take the form of pellets or powder, or these materials may simply surround the initiator 52.

Figure 2:
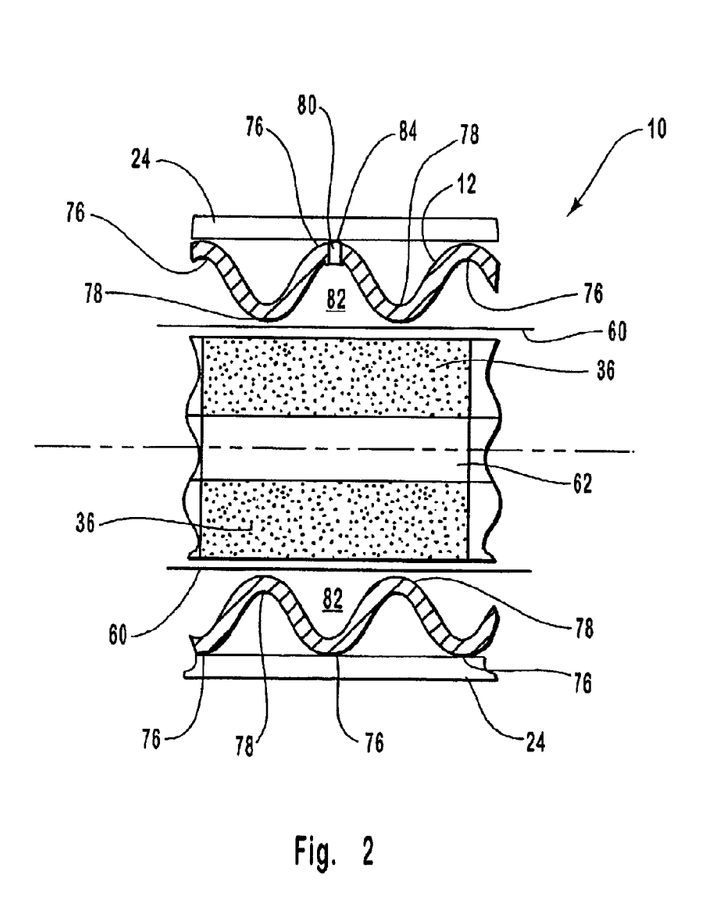
FIG. 2 is side cross sectional view of a center portion of the airbag/curtain inflator of FIG. 1.

Referring now to FIG. 2, the corrugated housing 12 defines distal peak portions 76 and proximal valley portions 78. The housing 12 defines exit ports 80, through which inflation fluid or gas can escape into an airbag curtain. It will be appreciated by those of skill in the art the size and number of the exit ports 80, together with the combustion properties of the combustible material 36, allows the inflation fluid to escape from the housing 12 at a substantially predetermined rate. The metal housing 12 allows for discrete and predictable exit port 80 orifices which will not erode or split under the heat or pressure of expanding inflation fluids. Thus, the present invention significantly reduces undesirable gas flow variability.

Figure 2A:
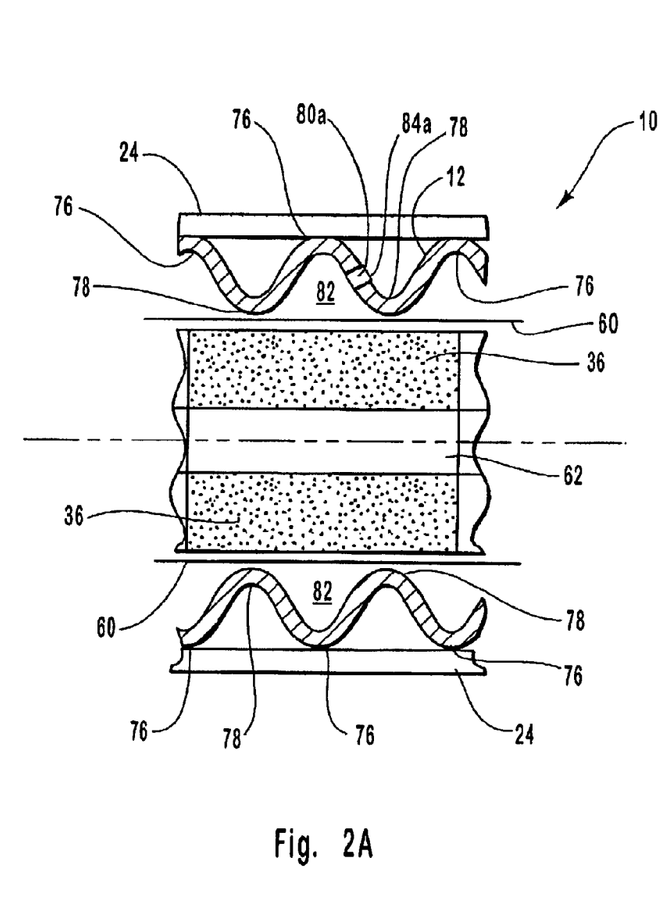

The exit ports 80 may be created within the housing 12 by piercing or perforation. The housing 12 may be perforated in any location where any burrs 84 left by the creation of the exit ports 80 are separated from the protective membrane 60. For example, as shown in FIG. 2, the housing 12 may be perforated adjacent the distal peak portions 76 to create an exit port 80 having burrs 84. Alternatively, as shown in FIG. 2A, the housing 12 may be perforated at a point between the distal peak portions 76 and the proximal valley portions 78 to create an exit port 80A having burrs 84A. In either embodiment, the housing 12 may be readily pierced without damaging the environmental seal or membrane 60.

The corrugated housing 12 also provides a plenum 82 which allows inflation gasses to readily flow out from around the combustible material 36. In one embodiment, the housing 12 is detached from and at least partially spaced apart from the membrane 60. In this configuration, the housing 12 can be flexed or expanded without stretching the membrane 60 and adversely affecting the combustible material 36. Thus, the present invention preserves the integrity of the combustible material 36 so that the rate of evolving inflation fluid is preserved.

In a preferred embodiment, exit ports 80 are pierced through the housing 12 prior to the application of the covering 24. This eliminates damage to the covering 24 and prevents damage to the airbag curtain from exposed wire ends. It will be appreciated by those of skill in the art that the wire braid covering 24 acts as a heat sink to cool the inflation fluid as it exits the inflator 10. Thus, the present invention reduces possible burn damage to vehicle passengers who come into contact with the inflated airbag. Other known materials with heat sink properties may be used for the covering 24, including ceramics, graphite, and other composite materials. The wire braid covering 24 also functions to filter out particulates that may be by-products of the combustion reaction. These particulates may cause damage to the airbag curtain being inflated by the inflator 10, if allowed to pass out of the inflator 10.

The initiator 52 ruptures the membrane 60 and directly lights the gas generating or combustible material 36. Inflation fluid forces the membrane 60 over the exit ports 80 in the corrugated housing 12, and the inflation fluid bursts through the membrane 60 at a predetermined breakout pressure. The breakout pressure is determined in part by the thickness and tensile strength of the membrane 60 selected, and the type of combustible material 36 used.

Figure 3:
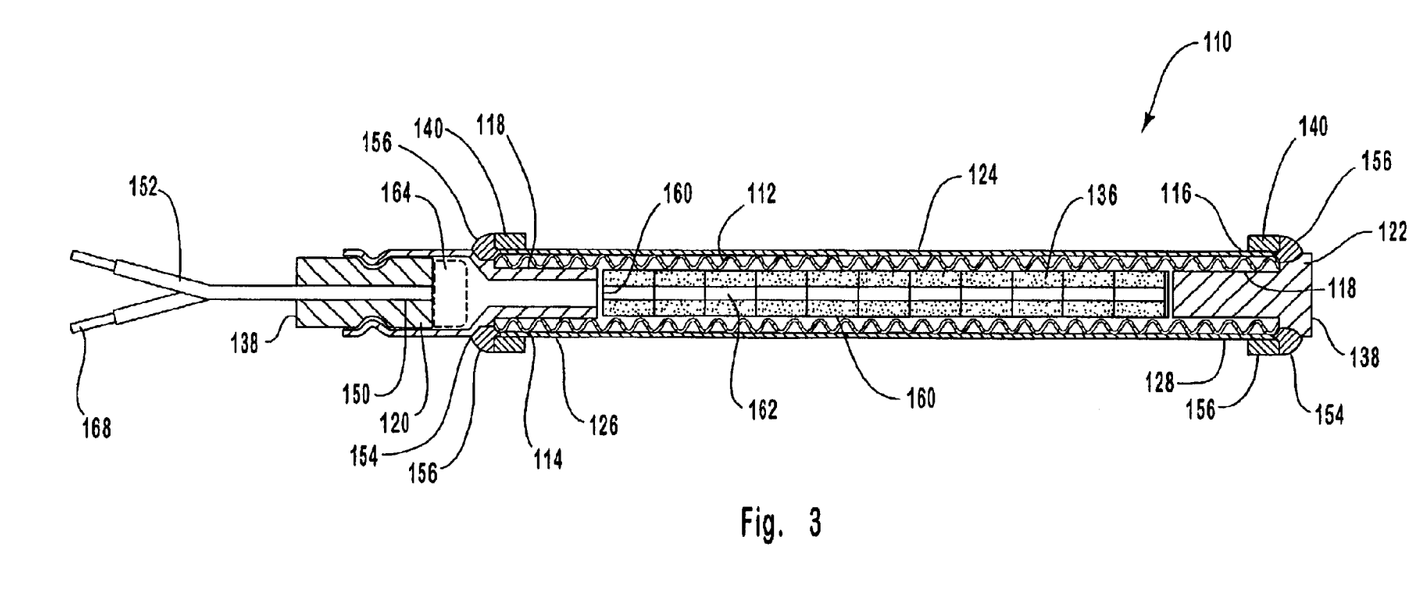
FIG. 3 is a side cross sectional view of yet another embodiment of an airbag/curtain inflator according to the present invention.

Referring now to FIG. 3, an alternative inflator embodiment of the present invention is generally designated as 110. The inflator 110 includes a corrugated cylindrical housing 112 having a first end 114 and a second end 116. The housing 112 defines openings 118 defined by each end 114, 116. The openings 118 are configured to received a first end cap 120 adjacent the first end 114 of the housing 112, and a second end cap 122 adjacent the second end 116 of the housing 112. The housing 112 may includes a suitable covering 124 positioned about the housing 112 which assists in maintaining the inflator as a pressure vessel and may also act as a heat sink. In the embodiment illustrated, the covering 124 is wire mesh. The covering 124 has a first end 126 and a second end 128.

The end caps 120, 122 are each attached to the housing 112 and covering 124 with a weld ring 140. The end caps 120, 122 each contain a stop portion 132 positioned within each end 114, 116 of the housing 112. An outer end 138 of each end cap 120, 122 includes an annular extension 154. The respective ends 114, 116 of the housing 112, the respective ends 126, 128 of the covering 124, and each weld ring 140, are positioned adjacent the extension 154 of each end cap 120, 122 and welded together at a weld point 156. In one embodiment, the weld ring 140, housing 112, and covering 124 are welded together for a first weld. The end caps 120, 122, one of which may contain an initiator 152 for igniting combustible material 136, are then welded to the first weld in a subsequent step.

The combustible material 136 is capable of generating inflation fluid when heated, ignited or when a combustible reaction is otherwise started. In the embodiment illustrated, the combustible material 136 includes combustible solid fuel tablets coated with an ignition enhancer. The combustible material 136 or generant is preferably compressed to maximize space. The combustible material 136 is substantially enclosed by a membrane 160. The membrane 160 is positioned within the housing 112 and defines a combustion chamber 162 in which the combustible material 136 reacts to form inflation fluid. The membrane 160 is configured to expand and burst at a predetermined breakout pressure created by the inflation fluid, after the combustible material 136 is ignited.

The initiator 152 is in communication with the combustible material 136, for initiating a combustible reaction within the housing 112 and combustion chamber 162. The initiator 152 includes an electrical connector 168 for connection to a collision sensor (not shown) which provides a signal to activate the initiator 152 and thus the inflator 110. The initiator 152 is suitable for bursting through a bulkhead or membrane 160 to ignite the combustible material 136. Exit ports (not shown) are configured within the housing 112 to allow inflation fluid to exit the combustion chamber 162 and enter an airbag curtain (not shown).

Figure 4:
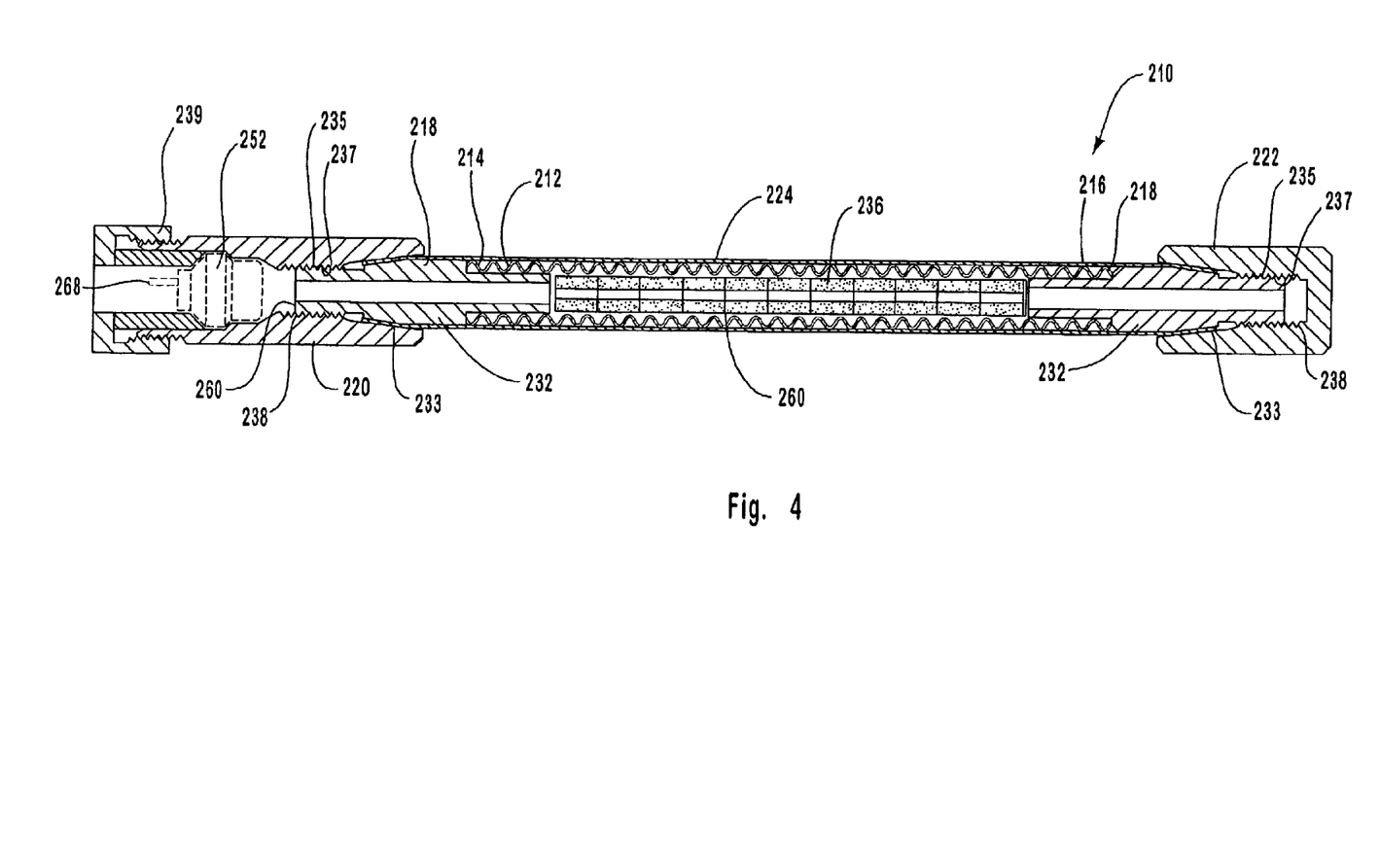
FIG. 4 is a side cross sectional view of another embodiment of an airbag/curtain inflator according to the present invention.

Referring now to FIG. 4, another alternative inflator embodiment of the present invention is generally designated as 210. The inflator 210 includes a corrugated cylindrical housing 212 having a first end 214 and a second end 216. The housing 212 defines openings 218 defined by each end 214, 216. The housing 212 may include a suitable covering 224 positioned about the housing 212 which assists in maintaining the inflator as a pressure vessel and may also act as a heat sink. In the embodiment illustrated, the covering 224 is braided steel. The covering 224 has a first end 226 and a second end 228. A first end cap 220 is positioned adjacent the first end 214 of the housing 212, and a second end cap 222 is positioned adjacent the second end 216 of the housing 212.

In this embodiment, a stop 232 is positioned within the openings 218 of each end 214, 216 of the housing 212. The stops 232 each have a tapered exterior portion 233 and exterior threads 235 configured within an outer end 238 of each stop 232. The first and second end caps 220, 222 each have interior threads 237 configured to engage the exterior threads 235 of the stops 232. The end caps 220, 220 are positioned about respective ends 226, 228 of the covering 224 which acts as an extension of the housing 212. With the exterior threads 235 of the stop 232 in mating engagement with the interior threads 237 of the end caps 220, 222, the ends 226, 228 of the covering 224 are clamped between the end caps 220, 222 and the stops 232 at the tapered exterior portion 233 of each stop 232. With the end caps 220, 222 screwed to the stops 232 about the covering 224, the tapered exterior portion 233 of each stop 232 prevents the stops 232 from exiting the housing 212. In other embodiments, the stops 232 may be secured within the housing 212 by bonding, welding, latching, or other known attaching methods. The first end cap 220 is configured with external threads 239 for receiving a threaded initiator assembly 252.

As with embodiments described above, the combustible material 236 is capable of generating inflation fluid when heated, ignited or when a combustible reaction is otherwise started. In the present invention, the combustible material 236 includes combustible solid fuel tablets coated with an ignition enhancer. The combustible material 236 is substantially enclosed by a membrane 260. The membrane 260 is positioned within the housing 212 and defines a combustion chamber 262 in which the combustible material 236 reacts to form inflation fluid. The membrane 260 is configured to expand and burst at a predetermined breakout pressure created by the inflation fluid, after the combustible material 236 is ignited.

The initiator 252 assembly is in communication with the combustible material 236, for initiating a combustible reaction within the housing 212 and combustion chamber 262. The initiator 252 includes an electrical connector 268 for connection to a collision sensor (not shown) which provides a signal to activate the initiator 252 and thus the inflator 210. The initiator 252 is configured to burst through a bulkhead or membrane 260 to ignite the combustible material 236. Exit ports (not shown) are configured within the housing 112 to allow inflation fluid to exit the combustion chamber 162 and enter an airbag curtain (not shown).

The present invention may be embodied in other specific forms without departing from its structures, methods, or other essential characteristics as broadly described herein and claimed hereinafter. The described embodiments are to be considered in all respects only as illustrative, and not restrictive. The scope of the invention is, therefore, indicated by the appended claims, rather than by the foregoing description. All changes that come within the meaning and range of equivalency of the claims are to be embraced within their scope.

What is claimed and desired to be secured by United States Letters Patient is:

1. An airbag inflator, comprising:
a housing having a first and second end, said housing comprising corrugated material such that the housing is axially expandable;
a first end cap attached to a first end of said housing;
a second end cap attached to a second end of said housing;
combustible material positioned within the housing, said material capable of generating inflation fluid upon ignition; and
an initiator in communication with the combustible material, for initiating a combustible reaction within the housing.

2. The inflator of claim 1, wherein the housing is flexible.

3. The inflator of claim 1, wherein the housing, first end cap, and second end cap comprise a pressure vessel.

4. The inflator of claim 1, wherein the housing comprises steel.

5. The inflator of claim 1, wherein the corrugated housing is perforated, thereby allowing inflation fluid to escape the housing at a predetermined rate.

6. The inflator of claim 5, wherein the corrugated housing defines distal peak portions and proximal valley portions, said distal peak portions being perforated.

7. The inflator of claim 5, wherein the corrugated housing defines distal peak portions and proximal valley portions, and wherein the housing is perforated at a point between the distal peak portions and proximal valley portions.

8. The inflator of claim 1, wherein the first and second end caps comprise steel.

9. The inflator of claim 1, wherein the combustible material comprises combustible solid fuel tablets coated with an ignition enhancer.

10. The inflator of claim 1, wherein the combustible material comprises stored inert gas.

11. The inflator of claim 1, wherein the combustible material is substantially enclosed by a membrane, said membrane defining a combustion chamber.

12. The inflator of claim 11, wherein the membrane comprises an environmental seal.

13. The inflator of claim 11, wherein the membrane comprises a metalized film.

14. The inflator of claim 11, wherein the membrane is configured to expand and burst at a predetermined breakout pressure created by the inflation fluid.

15. The inflator of claim 11, wherein the housing is detached from the membrane.

16. The inflator of claim 1, wherein the inflator further comprises a wire covering positioned about the housing, said covering having a first end attached to the first cap and a second end attached to a second cap.

17. The inflator of claim 16, wherein the covering comprises braided steel wires.

18. The inflator of claim 16, wherein the housing, first end cap, second end cap, and covering comprises a pressure vessel.

19. The inflator of claim 1, wherein the first and second end caps are each secured to the housing by a weld ring.

20. The inflator of claim 1, wherein the first and second end caps are each secured to the housing by a crimped sleeve.

21. The inflator of claim 1, wherein the first and second end caps are threaded to engage corresponding threads in the housing.

22. The inflator of claim 1, wherein the initiator comprises a squib.

23. The inflator of claim 22, wherein the squib is integral with one of said first and second end caps.

24. An airbag inflator, comprising:
a flexible housing having a first and second end, said housing comprising corrugated steel and defining distal peak portions and proximal valley portions, the distal peak portions being perforated with exit ports, thereby allowing inflation fluid to escape from the housing at a predetermined rate;
a first end cap attached to a first end of said housing;
a second end cap attached to a second end of said housing, the housing, first end cap, and second end cap forming a pressure vessel;
a membrane positioned within, and detached from, the housing, said membrane defining a combustion chamber;
combustible material positioned within the membrane, said material capable of generating inflation fluid upon ignition;
a wire mesh covering positioned about the housing, said covering having a first end attached to the first cap and a second end attached to a second cap and
an initiator in communication with the combustible material, for initiating a combustible reaction within the housing.

25. An airbag inflator, comprising:
a flexible housing having a first and second end, said housing comprising corrugated metal, the corrugated housing being perforated with exit ports, thereby allowing inflation fluid within the housing to escape from the housing at a predetermined rate;
a first end cap attached to a first end of said housing;
a second end cap attached to a second end of said housing;
a membrane positioned within the housing, said membrane defining a combustion chamber;
combustible material positioned within the membrane, said material capable of generating inflation fluid upon ignition;
a covering positioned about the housing, said covering having a first end attached to the first cap and a second end attached to a second cap and
an initiator in communication with the combustible material, for initiating a combustible reaction within the housing.

26. The inflator of claim 25, wherein the covering comprises braided steel wire.

27. The inflator of claim 26, wherein the corrugated housing defines distal peak portions and proximal valley portions, said housing being perforated adjacent the distal peak portions.

28. The inflator of claim 26, wherein the corrugated housing defines distal peak portions and proximal valley portions, and wherein the housing is perforated at a point between the distal peak portions and proximal valley portions.

29. The inflator of claim 25, wherein the membrane comprises an environmental seal.

30. The inflator of claim 29, wherein the membrane is configured to expand and burst at a predetermined breakout pressure created by the inflation fluid.

31. The inflator of claim 30, wherein the housing is detached from the membrane.

32. The inflator of claim 25, wherein the housing, first end cap, second end cap and covering comprise a pressure vessel.

33. The inflator of claim 25, wherein the housing comprises steel.

34. The inflator of claim 25, wherein the first and second end caps comprise steel.

35. The inflator of claim 25, wherein the combustible material comprises combustible solid fuel tablets coated with an ignition enhancer.

36. The inflator of claim 25, wherein the combustible material comprises stored inert gas.

37. The inflator of claim 25, wherein the membrane comprises mylar.

38. The inflator of claim 25, wherein the first and second end caps are each secured to the housing by a weld ring.

39. The inflator of claim 25, wherein the first and second end caps are each secured to the housing by a crimped sleeve.

40. The inflator of claim 25, wherein the first and second end caps are threaded to engage corresponding threads in the housing.

41. The inflator of claim 25, wherein the initiator comprises a squib.

42. The inflator of claim 41, wherein the squib is integral with one of said first and second end caps.

* * * * *